US006175566B1

(12) United States Patent
Hahn et al.

(10) Patent No.: US 6,175,566 B1
(45) Date of Patent: Jan. 16, 2001

(54) BROADCAST TRANSFER METHOD FOR A HIERARCHICAL INTERCONNECTION NETWORK WITH MULTIPLE TAGS

(75) Inventors: Jong-Seok Hahn; Won-Sae Sim; Suk-Han Yoon, all of Daejon-Shi (KR)

(73) Assignee: Electronics and Telecommunications Research Institute, Daejon-Shi (KR)

( * ) Notice: Under 35 U.S.C. 154(b), the term of this patent shall be extended for 0 days.

(21) Appl. No.: 08/924,791

(22) Filed: Sep. 5, 1997

(30) Foreign Application Priority Data

Sep. 11, 1996 (KR) .................................................. 96-39267

(51) Int. Cl.[7] .................................................. H04L 12/28
(52) U.S. Cl. .......................................... 370/390; 370/389
(58) Field of Search .................................... 370/351, 389, 370/392, 398, 400, 422, 467, 390, 395

(56) References Cited

U.S. PATENT DOCUMENTS

| | | | |
|---|---|---|---|
| 4,890,281 | * 12/1989 | Balboni et al. | 370/60 |
| 5,229,991 | * 7/1993 | Turner | 370/60 |
| 5,392,280 | * 2/1995 | Zheng | 370/60 |
| 5,584,014 | * 12/1996 | Nayfeh et al. | 395/461 |
| 5,636,210 | * 6/1997 | Agrawal | 370/390 |
| 5,825,773 | * 10/1998 | Shutoh et al. | 370/398 |

OTHER PUBLICATIONS

Butner, Steven E., et al., *A Fault–Tolerant GaAs/CMOS Interconnection Network for Scalable Multiprocessors*, IEEE, May 5, 1991, pp. 692–705.

\* cited by examiner

Primary Examiner—Huy D. Vu
Assistant Examiner—Alexander Boakye
(74) Attorney, Agent, or Firm—Cohen, Pontani, Lieberman & Pavane

(57) ABSTRACT

A broadcast transfer method for transferring the same data from any one node of the interconnection network of the parallel processing computer to every other nodes. The object of the present invention is to provide a broadcast transfer method for a hierarchical interconnection network with multiple tags which can be easily expanded, wherein each switch can perform a routing control function, and which enables the same packet to be transferred irrespective of the receiving group of each layer even when multiple tags are used in the same manner as in the point-to-point packet transfer. The broadcast transfer method for a hierarchical interconnection network with multiple tags in accordance with the present invention comprises the steps of using a single tag structure; discriminating if a routing switch belongs to a layer one cluster interconnection network or a layer two cluster interconnection network by using a hub/cluster discrimination signal; and outputting the corresponding packet type in accordance with the input location where a packet is received at the corresponding routing switch to enable all receiving nodes to receive the same data.

1 Claim, 7 Drawing Sheets

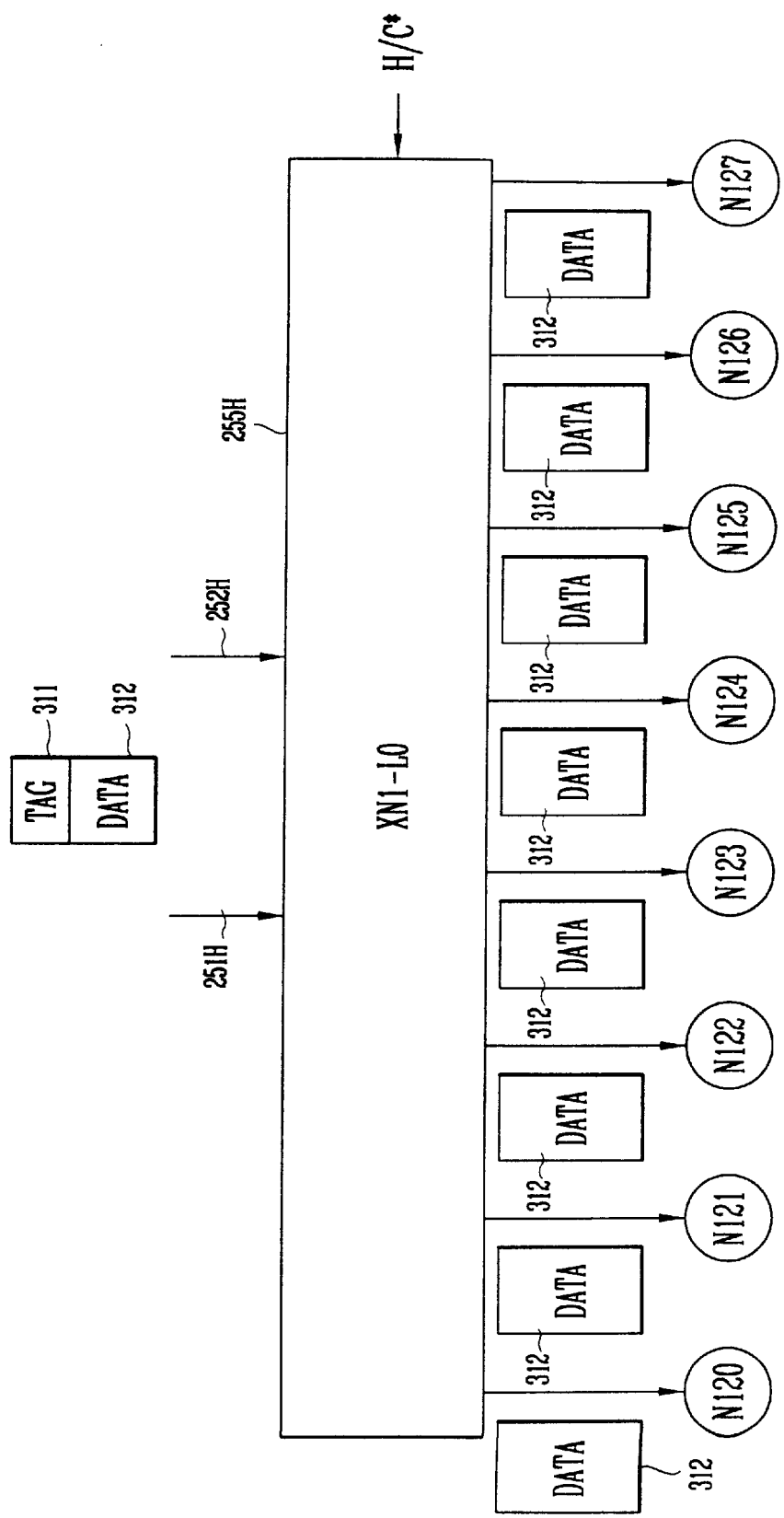

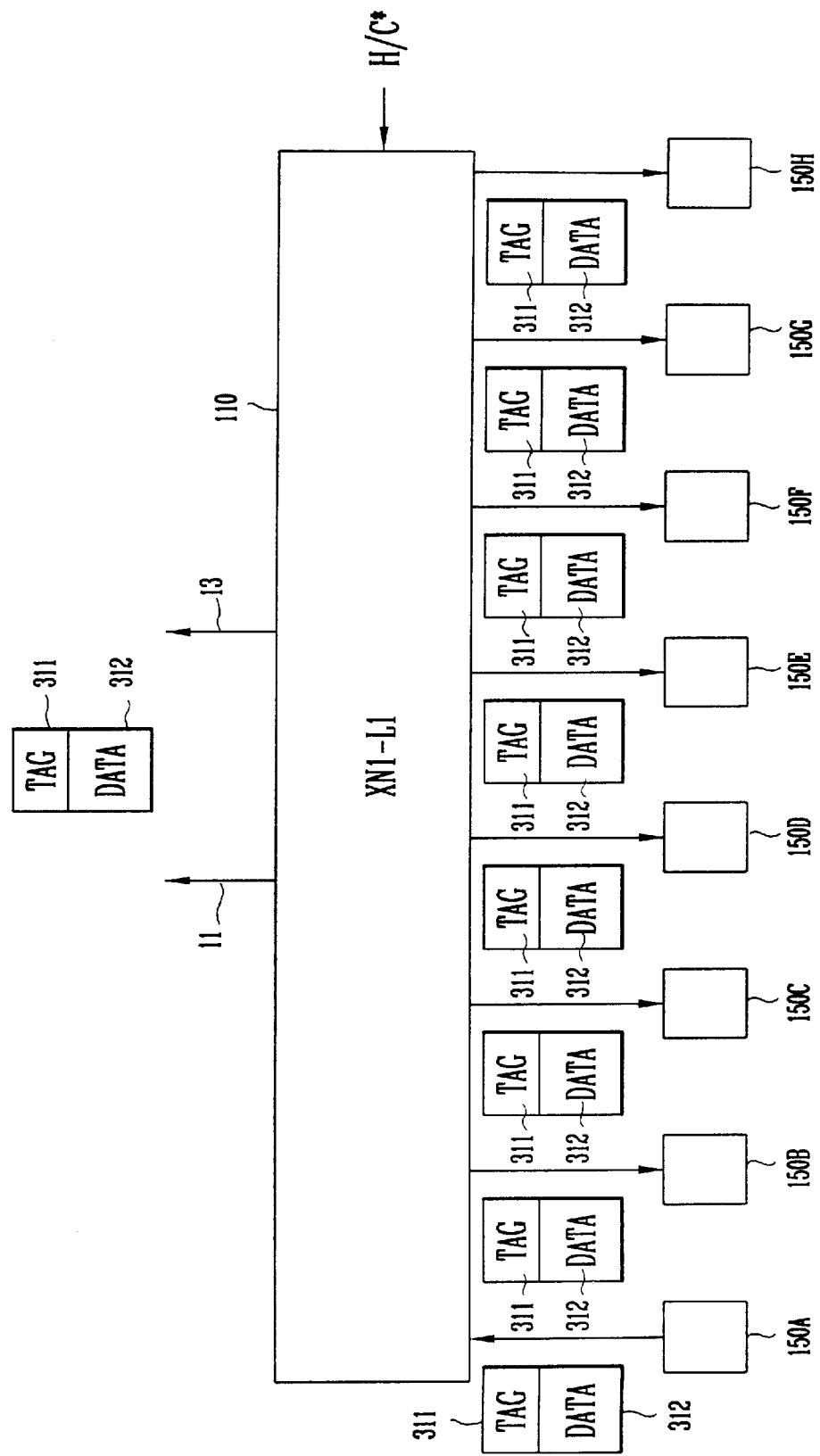

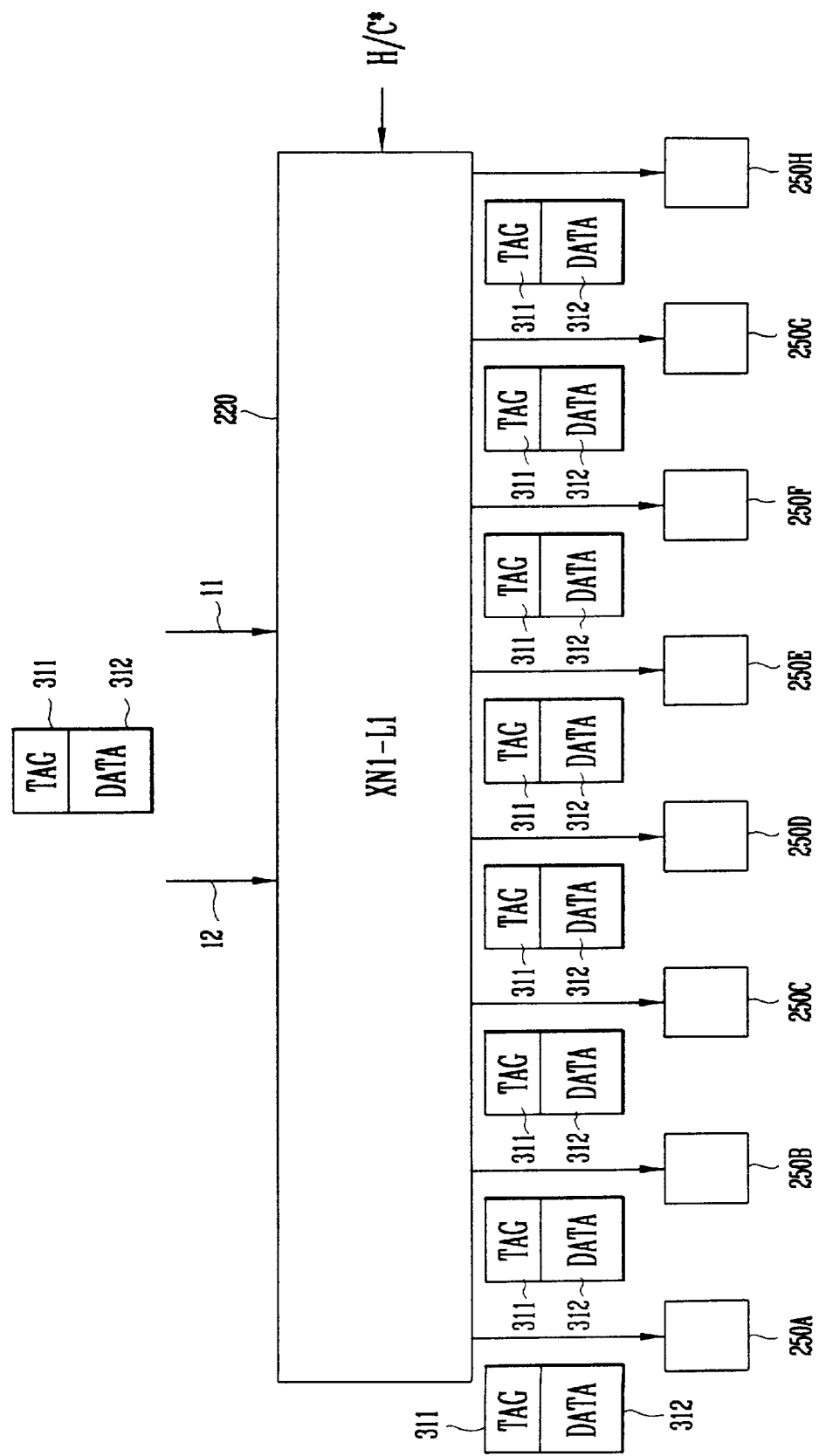

BROADCAST TRANSFER METHOD FOR A HIERARCHICAL INTERCONNECTION NETWORK WITH MULTIPLE TAGS

BACKGROUND OF THE INVENTION

1. Field of the Invention

The present invention relates to a broadcast transfer method for transferring the same data from one node to every other nodes, i.e., one of the functions of a interconnection network which is the key element of a parallel processing computer, and more particularly, to a broadcast transfer method adapted for a packet switching hierarchical interconnection network using a distributed routing control method and a packet of multiple tags.

2. Description of the Related Art

In general, an interconnection network is a network which connects between processors or between a processor and a storage device in a parallel processing computer. The transfer method of the interconnection network includes a point-to-point transfer, a broadcast transfer, and a multicast transfer.

The broadcast transfer, one of the important functions of the interconnection network is to transfer data from a transmitting node to every other receiving nodes connected to the interconnection network by a single operation when the same data is transferred to all nodes. However, in the interconnection network wherein a broadcast transfer is not supported, the same data should be transferred by a point-to-point transfer a number of times which corresponds to the number of receiving nodes. This ultimately results in the degradation of the transmission efficiency and the system performance because the traffic of the interconnection network and the latency are increased.

The routing switch as disclosed in U.S. Pat. No. 4,890,281 (Dec. 26, 1989) to Gian P. Balboni, et al. entitled "Switching Element for Self-Routing Multistage Packet-Switching Interconnection Network" is a 2×2 switching element constituting a multistage interconnection network for packet transmission, performs a self-routing function, and transfer data to a receiving node. Since an address representation area of only one bit is needed for each routing switch to perform a routing control in the multistage interconnection network consisting of a 2×2 routing switch, a maximum of 8 stages of an address representation can be allowed when a 8-bit data length is provided for each port.

The above multistage interconnection network is made of a non-hierarchical structure, not a hierarchical structure. This interconnection network provides a low expandability compared to an interconnection network of a hierarchical structure, and performs a point-to-point transfer and broadcast transfer using a single tag structure. The single tag structure has an advantage over a multitag structure that less load is given to a transmitting node generating a tag, however the multistage interconnection of a single tag structure has a limitation in expansion due to a constraint on the structure of the tag.

A non-blocking multicast multistage interconnection network as disclosed in U.S. Pat. No. 5,179,551 (Jan. 12, 1993) issued to Jonathan S. Turner which efficiently provides a multicast transmission uses a 4×4 routing switch as a basic element. Turner solved the problem of blocking which can be occurred when performing a multicast transmission by expanding the stages of a basic multistage interconnection network having a blocking characteristic. The broadcast transfer is a part of the multicast transfer, and thus the availability of a multicast transfer implies the availability of a broadcast transfer. However, although the above interconnection network has a packet switching structure, it has a problem that each switch does not perform a routing control function because it uses a central routing control scheme instead of a distributed routing control scheme wherein a routing control is performed by each routing switch by using a tag of each transfer packet.

In the distributed routing control scheme, a routing control is performed in each routing switch constituting the interconnection network, while in the central routing control scheme, each switch is controlled by one central control unit to perform a routing control.

A shunt interconnection network, one of interconnection networks of a hierarchical structure, as disclosed in the paper entitled "A Fault-Tolerant GaAs/CMOS Interconnection Network for Scalable Multiprocessors," in IEEE Journal of Solid-State Circuits, pp. 692–705, May 1991 by Steven E. Butner, et al. is a crossbar interconnection network having a hierarchical structure. The shunt interconnection network supports an expandability of data length as well as an expandability of a hierarchical structure through a bit slice concept. However a basic block constituting an interconnection network is a set consisting of a plurality of switches, a plurality of network interface elements and a controller for controlling the switches and the elements, instead of a single switch. The proposed switch block has a circuit switching structure.

In the circuit switching structure, only pure data is transferred without a tag for routing control, once a transmission path has been established, compared to a packet switching structure. In the packet switching hierarchical interconnection network using a distributed routing control method, a tag structure having an address representation area encoded on a hierarchical basis is used to represent a receiving node on a tag of a packet. For example, three groups of address representation areas for specifying a port address of the interconnection network of a first layer, a port address of the interconnection network of a second layer and a port address (receiving node) of the interconnection network of the first layer to represent a receiving node in an interconnection network of two layers.

As the system expansion is performed in a parallel processing system having an expandability, most hierarchical interconnection network requires many hierarchical layers and more address representation areas for representing receiving nodes. When it is difficult to assign these address representation areas to a tag having the size of a data length, the use of multiple tags is essential. One of multiple tags represents a port address of one layer or multiple layers of the interconnection network. However, one tag of the multiple tags is generally designed to represent one layer of the hierarchical interconnection network since the functions of the interconnection network become complex and difficult to implement when address representation areas of multiple layers are assigned to one tag of the multiple tags. The hierarchical interconnection network using multiple tags is exhausted after it confirms a port address in the corresponding layer represented by one tag. This is because only after the corresponding tag is eliminated in the corresponding layer, a port can be specified with an exact address of the tag in the next layer. To this end, the interconnection network transfers the remaining packets after the corresponding tag has been eliminated.

For the point-to-point packet transfer, the transmitting node transmitting a packet generates the corresponding multiple tags in accordance with the location of the corresponding receiving node, and transfers them to the receiving node along with data of the packet. The receiving node receives pure data portion with the multiple tags eliminated in the packet which has passed each layer of the interconnection network. However, for the broadcast packet transfer where data is transferred simultaneously from one transmitting node to all receiving nodes, one packet transmitted from the transmitting node is copied and broadcasted as it passes through each layer of the interconnection network. Thus, when the broadcast transfer is performed using multiple tags, the number of multiple tags is set based on the receiving node passing through the largest number of layers among receiving nodes.

When the multiple tags are used in the same manner as in the point-to-point packet transfer, the problem arises that different packets are received according to the receiving group of each layer. In other words, some receiving nodes passing through the layers of the interconnection network whose number is equal to the number of the multiple tags receive pure data portion with multiple tags eliminated, while some receiving nodes passing through the layers of the interconnection network whose number is less than the number of the multiple tags receive a portion of multiple tags and the remaining data portion.

SUMMARY OF THE INVENTION

It is therefore an object of the present invention to provide a broadcast transfer method for a hierarchical interconnection network with multiple tags which can be easily expanded, wherein each switch can perform a routing control function, and which enables the same packet to be transferred irrespective of the receiving group of each layer even when multiple tags are used in the same manner as in the point-to-point packet transfer.

In accordance with one aspect of the present invention, a broadcast transfer method for a hierarchical interconnection network with multiple tags is provided which comprises the steps of using a single tag structure; discriminating if a routing switch belongs to a layer one cluster interconnection network or a layer two cluster interconnection network by using a hub/cluster discrimination signal; and outputting the corresponding packet type in accordance with the input location where a packet is received at the corresponding routing switch to enable all receiving nodes to receive the same data.

In a preferred embodiment of the present invention, the method further comprises the steps of transferring the remaining data with a tag eliminated to the other receiving node connected to the same layer one crossbar interconnection network from the transmitting node; transferring a broadcast packet including a tag to one of two ports connected to the layer two cluster interconnection network; and transferring the remaining data with a tag eliminated from the broadcast packet transferred from the layer two cluster interconnection network to all receiving nodes of the routing switch of the layer one cluster interconnection network belonging to the layer two cluster interconnection network.

The present invention seeks to solve the problem of data integrity occurred when a broadcast transfer is performed using multiple tags in the packet switching hierarchical interconnection network wherein the distributed routing control scheme and the multiple tag structure are used. Thus, in accordance with the present invention, the same data can be received at all receiving nodes when the broadcast transfer is performed. The broadcast transfer method in accordance with the present invention can be implemented by the functions of a routing switch constituting the interconnection network.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which:

FIGS. 4A–4D show views to illustrate a broadcast transfer operation of each switch.

DETAILED DESCRIPTION OF THE INVENTION

Figure 1:
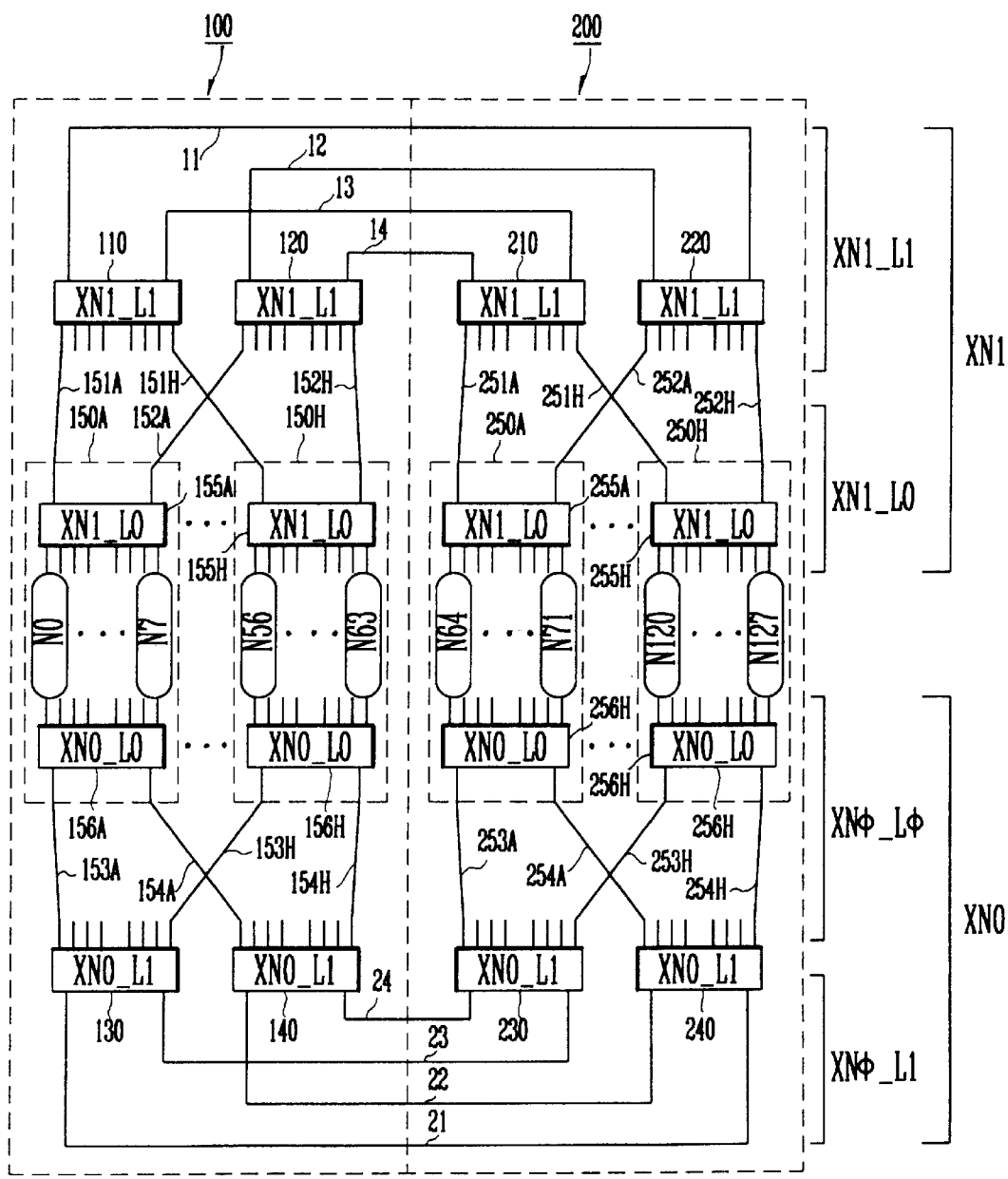
FIG. 1 shows a schematic view of a hierarchical crossbar interconnection network wherein 128 nodes are interconnected.

FIG. 1 shows a schematic view of a hierarchical crossbar interconnection network wherein 128 nodes are interconnected. The hierarchical crossbar interconnection network will now be described with reference to FIG. 1.

A layer two cluster 100 comprises 8 layer one clusters 150A–150H, 4 crossbar interconnection networks 110, 120, 130, 140, and a plurality of interconnection links 151A–151H, 152A–152H, 153A–153H, 154A–154H. The layer two cluster 100 can interconnect up to 64 nodes. Two links are provided between nodes in the same layer one cluster, and four interconnection networks are provided between nodes in one layer one cluster and nodes in the other layer one cluster.

The layer one clusters 150A–150H should use four separate layer two cluster interconnection networks 110, 120, 130, 140 to constitute the layer two cluster since each layer one cluster has four interconnection links to upper clusters. The layer two cluster interconnection network 110 has 8 interconnection links to lower clusters 151A–151H, 2 interconnection links to upper clusters 11, 13 for constituting a layer three cluster. The other three layer two cluster interconnection networks 120, 130, 140 have 8 interconnection links to lower clusters 152A–152H, 153A–153H, 154A–154H, 2 interconnection links to upper clusters 12 and 14, 21 and 23, 22 and 24 for constituting a layer three cluster as in the layer two cluster interconnection network 110. The other layer two cluster 200 has the same structure as the above layer two cluster 100.

The structure shown in FIG. 1 is a structure which can interconnect up to 128 nodes by interconnecting two layer two clusters 100, 200. 8 interconnection links 11–14, 21–24 are formed between two layer two clusters 100, 200. The reason behind this is that eight interconnection links 11–14, 21–24 are formed if two layer two clusters 100, 200 are directly connected since each layer two cluster 100, 200 has 8 interconnection links for layer three clusters.

Figure 2:
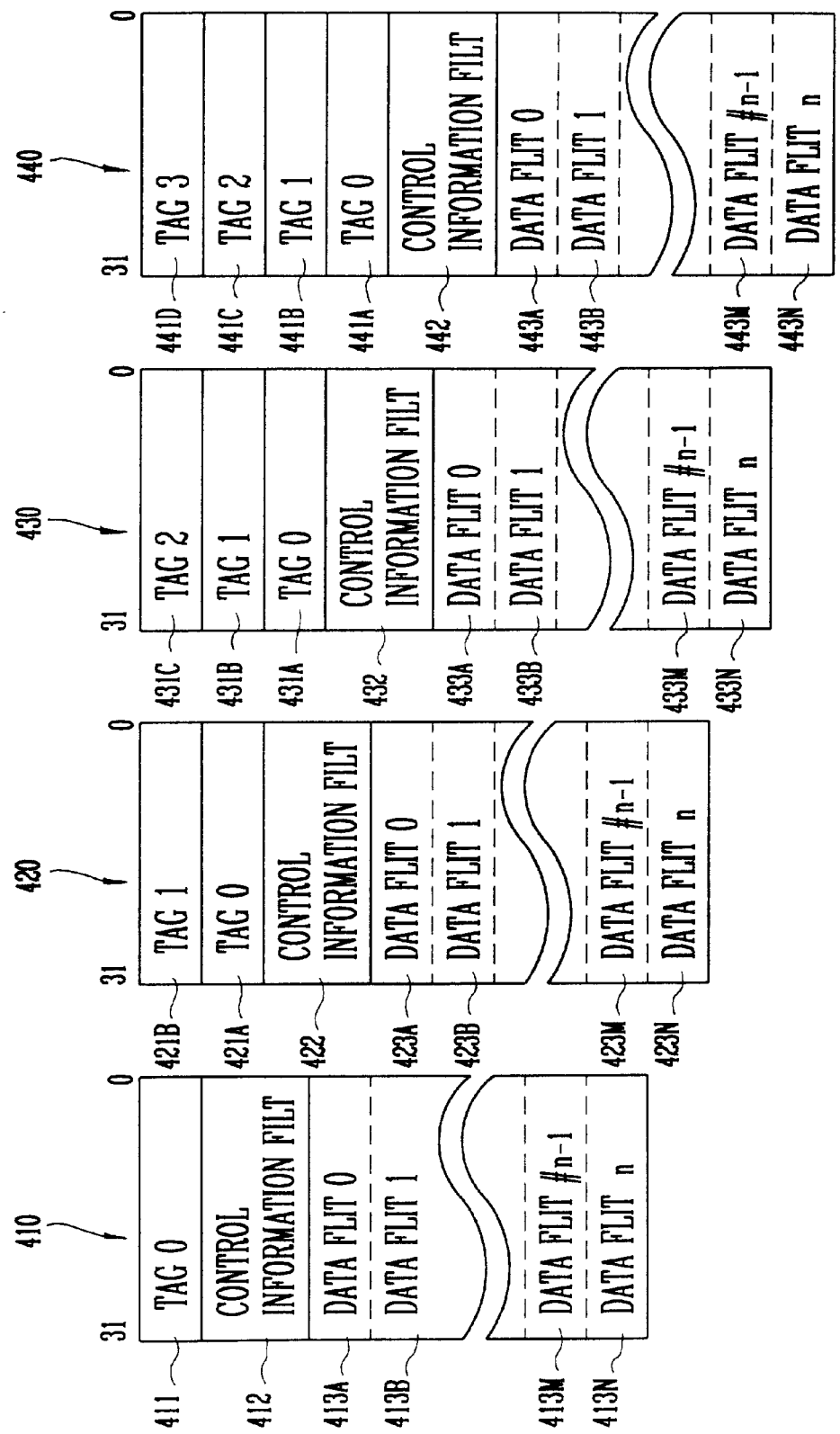
FIG. 2 shows a structure of a packet having a multiple tag structure.

FIG. 2 shows a structure of a packet having a multiple tag structure. The structure of the packet having a multiple tag structure will now be described with reference to FIG. 2. The packet in accordance with the present invention is used for the point-to-point data transfer in a hierarchical crossbar interconnection network which can provide an expandability by using the distributed routing control scheme of a packet switching structure. The packet consists of a set of flits, and the flit is data which is physically transferred at once.

The basic packet comprises multiple tag portions 411, 421A–421B, 431A–431C, 441A–441D, control information portions of one flit 412, 422, 432, 442, and data portion of multiple flits 413A–413N, 423A–423N, 433A–433N, 443A–443N. The packet 410 is a type of packet used in the interconnection networks 150A–150H comprising one layer one cluster. This comprises the tag 411 of one flit, control information 412 of one flit, and data portions 413A–413N of multiple flits, and is used for the point-to-point transfer of data.

The packet 420 is a type of packet used with the packet 410 in the interconnection network wherein two layer one clusters are directly connected without the intervention of a layer two interconnection network. This comprises two tags of flit 421A–421B, control information of one flit 422, and data portions 423A–423N of multiple flits, and is also used for the point-to-point transfer of data.

The packet 430 is a type of packet used with the packet 410 in the interconnection networks 100, 200 constituting a layer two cluster wherein more than two layer one cluster is connected to the layer two interconnection network, and the three stage routing switch should be used when a point-to-point data transfer is made from the transmitting node of a layer one cluster to the receiving node of the other layer one cluster. This comprises three tags 431A–431C of flits, control information 432 of one flit, and data portions 433A–433N of multiple flits.

The packet 440 is a type of packet used with the packets 410, 430 in the interconnection network of FIG. 1 wherein two layer two clusters are directly connected without the intervention of a layer three interconnection network. This comprises four tags of flit 441A–441D, control information of one flit 442, and data portions 443A–443N of multiple flits, and is also used for the point-to-point transfer of data.

The packets such as the packets 410 or 430 are used in the interconnection network of FIG. 1 wherein two layer two clusters are directly connected without the intervention of the layer three interconnection network. In other words, the packet of the type of the packet 410 is used when data is transferred from the transmitting node to the receiving node belonging to the same layer one cluster as the transmitting node, and the packet of the type of the packet 430 is used when data is transferred from the transmitting node to the receiving node belonging to the other layer one cluster within the same layer two cluster as the transmitting node.

Figure 3:
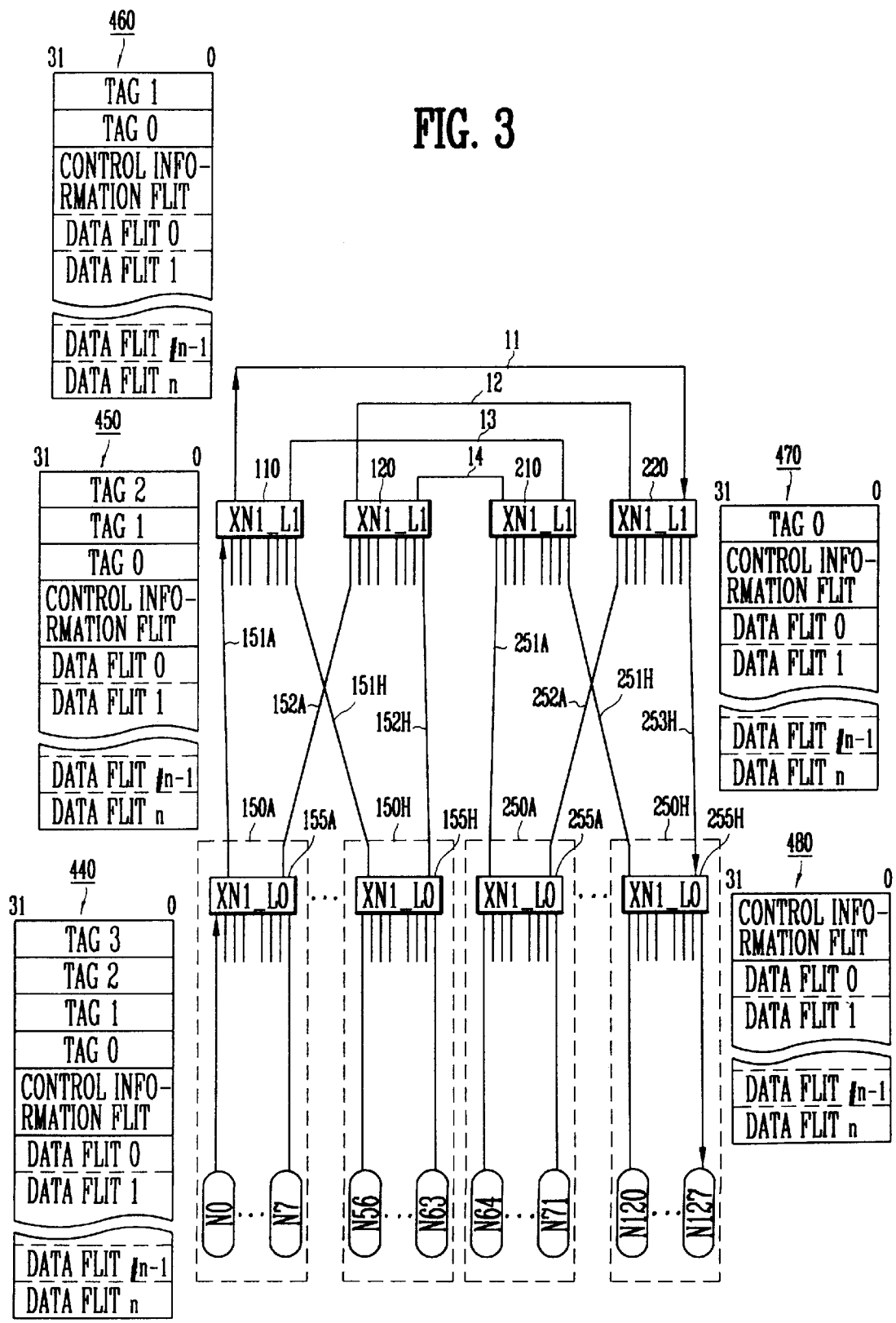
FIG. 3 shows an example of a point-to-point transfer using multiple tags.

FIG. 3 shows an example of a point-to-point transfer using multiple tags. The point-to-point transfer of data using multiple tags in a hierarchical crossbar interconnection network wherein 128 nodes are interconnected will now be described with reference to FIG. 3. The hierarchical crossbar interconnection network is duplicated as in FIG. 1, and thus the transmission node or the receiving node can transmit or receive via any one of ports by using two interconnection ports. In FIG. 3, one side of the hierarchical crossbar interconnection network has been illustrated to represent a point-to-point transfer using multiple tags.

Referring to FIG. 3, the process of the point-to-point transfer of the packet 440 from the transmitting node to the receiving node belonging to the other layer two cluster is illustrated. Note that the node N0 transmits data packet by using a transmission function, and the node N127 receives data packet by using a receiving function. In other words, all nodes from the node N0 to the node N127 can be a transmitting node or a receiving node.

The packet 410 is used when the transfer is made from the transmitting node N0 to the receiving nodes N0–N7 belonging to the same layer one cluster within the same layer two cluster. The packet 430 is used when the transfer is made from the transmitting node N0 to the receiving nodes N8–N63 belonging to the other layer one cluster within the same layer two cluster. The packet 440 is used when the transfer is made from the transmitting node N0 to the receiving nodes N64–N127 belonging to the other layer two cluster. In other words, when the data transfer is made from the transmitting node N0 to the receiving node N127, the packet 440 comprising four tags of flits 441A–441D, control information of one flit 442, and data portions 443A–443N of multiple flits is used.

The routing switch 155A connected to the transmitting node 0 performs a routing control by the routing switch 110N belonging to a layer two cluster according to the corresponding tag 441D. The routing switch 155A outputs the tags 441A–441C of the remaining three flits except the corresponding tag 441D, control information of one flit 442, and data 443A–443N of multiple flits. The routing switch 110 of the layer two cluster receives a packet 450 from an input port, and performs a routing control by a routing switch 220 belonging to the other layer two cluster according to the corresponding tag 441C. Similarly, the routing switch 110 outputs the tags 441A–441B of the remaining two flits except the corresponding tag 441C, control information 442 of one flit, and data 443A–443N of multiple flits.

The routing switch belonging to the same layer two cluster as the receiving node N127 receives the packet 460 at the input: port, and performs a routing control by a routing switch 255H of a lower layer one cluster according to the corresponding tag 441B. The routing switch 220 outputs the tag 441A of the remaining one flit except the corresponding tag 441B, control information 442 of one flit, and data 443A–443N of multiple flits. The routing switch 255H connected to the receiving node N127 receives the packet 470 transmits control information 442 of one flit except the tag 441A and data 443A–443N of multiple flits to the receiving node N127 assigned to the corresponding tag 441A. All receiving nodes receive the packet 480 consisting of the remaining control information and data except a tag. The selection of multiple tags in accordance with the location of the corresponding receiving node is made at the transmitting node.

FIGS. 4A–4D show views to illustrate a broadcast transfer operation of each switch. The operation of each switch for the broadcast transfer will now be described with reference to FIG. 4A–FIG. 4D. The broadcast transfer method for transferring the same packet data to all receiving nodes N0–N127 from the routing switch 155A–155H, 255A–255H of the layer one cluster interconnection network of the hierarchical crossbar interconnection network and the routing switch 110, 120, 210, 220 of the layer two cluster interconnection network is illustrated in FIG. 4. Since the problem arises if the broadcast transfer is performed by using a multiple tag structure as in a point-to-point transfer, the multiple tag structure is used for the point-to-point transfer, while a single tag structure is used for the broadcast transfer. The multiple tag structure wherein a different number of tags is used in accordance with the location of the receiving node is used for the point-to-point transfer. When the broadcast transfer is performed, one tag representative of a broadcast transfer is used for data transfer. To use a dual tag structure which uses either multiple tags or a single tag in this way, each routing switch must differentiate between the point-to-point transfer and the broadcast transfer. For the point-to-point transfer, the remaining data with tags eliminated is transferred to the receiving node by using a multiple tag structure. For the broadcast transfer, data portion with tags eliminated can be simultaneously transferred to all receiving nodes by transferring data in accordance with the method proposed in the present invention.

Referring to FIG. 4A–FIG. 4D, the broadcast packet is divided into a tag portion 311 and a data portion 312, and a control information flit is regarded as a portion of data. That is, the broadcast packet consists of a tag portion 311 of one flit and a data portion 312 of multiple flits because a single tag is utilized for the broadcast transfer.

Figure 4A:
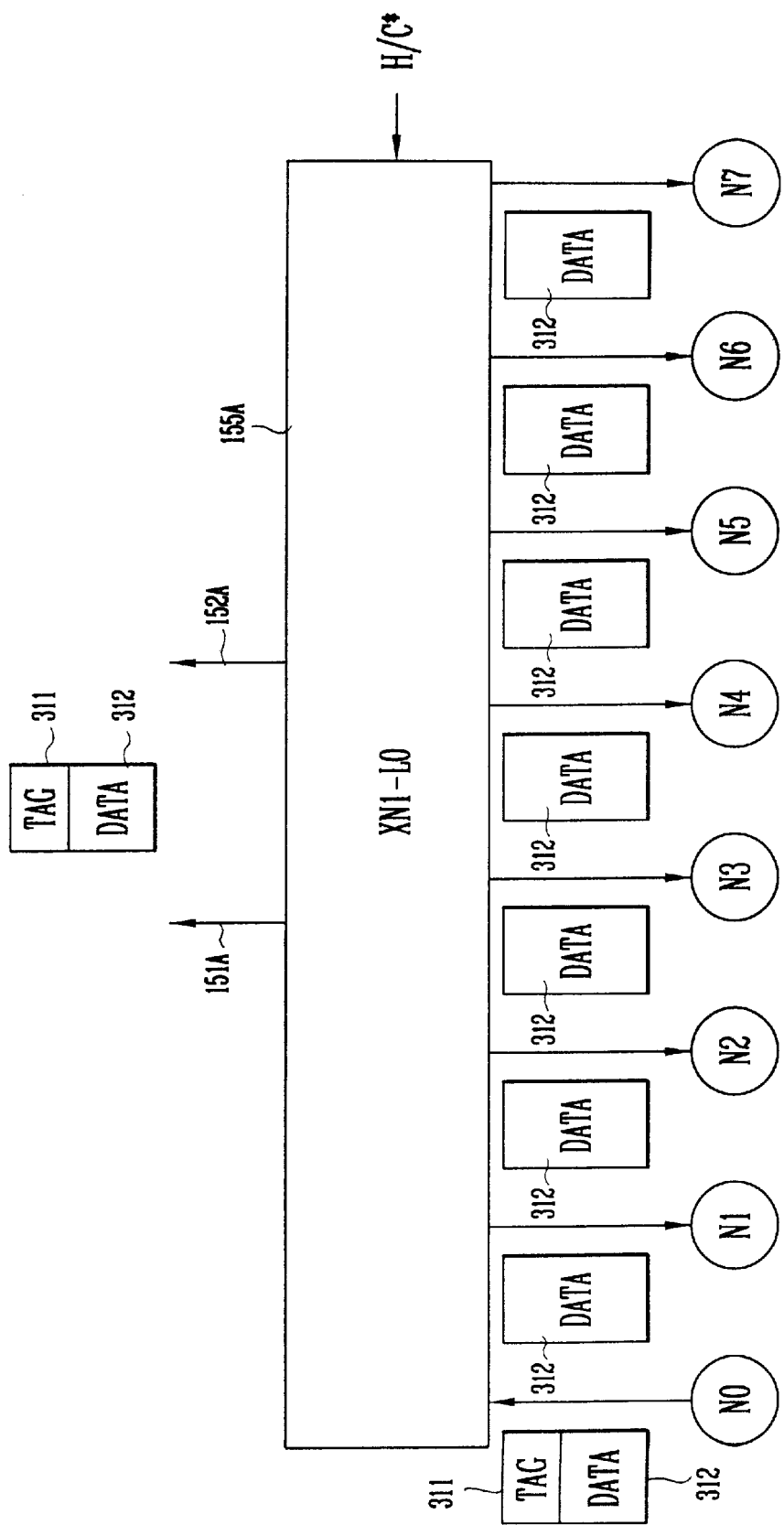

Referring to FIG. 4A, the broadcast packet is transferred at the transmitting node N0 connected to the routing switch 155A of the layer one cluster interconnection network. The remaining data portion 312 with a tag portion 311 eliminated is transferred to other receiving nodes N1–N7 connected to the same layer one crossbar interconnection network. Data including tags is transferred to one of two ports 151A, 152A connected to the layer two cluster interconnection network. A hub/cluster discrimination signal H/C* indicates whether the routing switch 155A belongs to the layer one cluster interconnection network or the layer two cluster interconnection network. In this example, the discrimination signal H/C* indicates that the routing switch 155A belongs to the layer one cluster interconnection network. When the broadcast transfer is performed, the routing switch 155A of the layer one cluster interconnection network transfers the broadcast packet with a tag eliminated to all receiving nodes N1–N7 within the same cluster except the routing switch 155A itself. In order to transfer a broadcast packet to the receiving nodes belonging to the other cluster, the routing switch 155A transfers a packet including a tag. When all data are transferred to two ports 151A, 152A connected to the layer two cluster interconnection network, other receiving nodes receive a duplicated broadcast packet. Thus, the broadcast packet is transferred to one of the two ports 151A, 152A.

Referring to FIG. 4B, the broadcast packet transferred from the layer two cluster interconnection network is transferred from the routing switch 255H of the layer one cluster interconnection network to the receiving nodes N120–N127. The data portion 312 with a tag portion 311 eliminated is transferred to all the receiving nodes. In other words, if the broadcast packet is input to one of the two ports 251H, 252H, and a request for the broadcast transfer is issued to all the receiving nodes N120–N127 connected to the routing switch 255H, the routing switch interprets this request to transfer the remaining data portion 312 with the tag portion 311 eliminated to all the receiving nodes N120–N127. The broadcast packet transferred from the layer two cluster interconnection network is from the transmitting node belonging to the other cluster. Thus, a retransmission from the corresponding routing switch to the other cluster is not required. The hub/cluster discrimination signal H/C* indicates that the routing switch belongs to the layer one cluster interconnection network.

Referring to FIG. 4C, the broadcast packet transferred from the layer one cluster interconnection network is transferred from the routing switches 110, 120 of the layer two cluster interconnection network to the other layer one cluster interconnection networks 150B–150H of the same layer two cluster interconnection network or to the other layer two cluster interconnection network or to the other layer three cluster interconnection network. In this case, the method of transferring the broadcast packet including a tag is illustrated. The hug/cluster discrimination signal H/C* indicates that the routing switch belongs to the layer two cluster interconnection network. The routing switches 110, 120, 210, 220 of the layer two cluster interconnection network merely relays the broadcast packet transferred from the routing switch of the layer one cluster interconnection network to the routing switch of the other layer one cluster interconnection network or to the routing switch of the other layer two cluster interconnection network. The broadcast packet includes a packet. Data including a tag is transferred to one of the two ports 11, 13 connected to the layer three cluster interconnection network or the other layer two cluster interconnection network.

Referring to FIG. 4D, the broadcast packet transferred from the other layer two cluster interconnection network or the layer three cluster interconnection network is transferred from the routing switch 210, 220 of the layer two cluster interconnection network to all the lower layer one cluster interconnection networks 250A–250H. In this case, the broadcast packet including a tag is merely relayed. The hug/cluster discrimination signal H/C* indicates that the routing switch belongs to the layer two cluster interconnection network.

As described above, the present invention provides an advantage that the same packet can be received at all receiving nodes when the broadcast transfer is performed in the packet switching hierarchical interconnection network which can be expanded and uses the distributed routing control scheme and the multiple tag structure.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A method for broadcast transfer of a data packet in a hierarchical interconnection network, wherein the network uses multiple tags in case of a point-to-point transfer, comprising the steps of:

broadcasting the broadcast data packet from a transmitting node connected to a routing switch to all receiving node using not multiple tags but a single tag in the data packet together with transmitting the point-to-point data packet using multiple tags;

discriminating if said routing switch belongs to a layer one cluster interconnection network or a layer two cluster interconnection network by using a hub/cluster discriminating signals in order to transmit either a data packet including single tag or a data packet excluding single tag;

transferring said data packet excluding a single tag from a transmitting node to receiving nodes belonging to a same layer one crossbar interconnection network, and the data packet including a single tag from a transmitting node to one of two ports connected to a layer two cluster interconnection network; and broadcasting the data packet excluding a single tag from the layer two cluster interconnection network to all other receiving nodes of the routing switch of the layer one cluster interconnection network belonging to the layer two cluster interconnection network.

\* \* \* \* \*